TRANSFORMER DISK WINDINGS FORMED OF A CONTINUOUS CONDUCTOR

Filed Jan. 17, 1963 2 Sheets-Sheet 1

INVENTORS
ISADORE K. DORTORT
SYLVESTER B. HEBERLIG
BY
OSTROLENK, FABER, GERB & SOFFEN
ATTORNEYS

June 8, 1965 I. K. DORTORT ETAL 3,188,591

TRANSFORMER DISK WINDINGS FORMED OF A CONTINUOUS CONDUCTOR

Filed Jan. 17, 1963 2 Sheets-Sheet 2

INVENTORS
ISADORE K. DORTORT
SYLVESTER B. HEBERLIG

BY

Ostrolenk, Faber, Gerb & Soffen
ATTORNEYS 3,188,591
TRANSFORMER DISK WINDINGS FORMED OF A CONTINUOUS CONDUCTOR
Isadore K. Dortort, Philadelphia, Pa., and Sylvester B. Heberlig, Glendora, N.J., assignors to I-T-E Circuit Breaker Company, Philadelphia, Pa., a corporation of Pennsylvania
Filed Jan. 17, 1963, Ser. No. 252,211
2 Claims. (Cl. 336—185)

This invention relates to a novel transformer winding construction, and more specifically relates to a novel manner of interconnecting adjacent disk wound windings of power transformers.

Disk windings are well known to the transformer art, and are comprised of disks of spirally wound windings which are contained around a magnetic core and which are stacked along the core in spaced planes. In forming these disk windings, it has been the prior practice to wind successive disks from the inside out and then from the outside in, so that there is a continuous connection between adjacent disks. This is accomplished by upsetting every other disk, or by winding disks separately and then crossing from disk to disk the interior of adjacent windings and the exterior of adjacent windings.

Either method is very costly, since a great deal of skilled labor is required. Moreover, in this type of arrangement, a relatively poor impulse voltage distribution is caused, since the capacitance to ground of each disk will be different. Moreover, the full voltage of two disks will appear at the top and then the bottom of alternate adjacent disks.

The principle of the present invention is to wind the disk coils of a disk-type winding in an identical manner by winding from the inside of the winding and outwardly, and thereafter bending the end of the outer winding downwardly to begin the next winding which will also be wound outwardly from the inside, and to electrically connect adjacent disks by a conductor which extends from the top of the first disk to the bottom of the second and adjacent disk, and so on.

In making this connection, appropriate and novel insulation means is provided to insulate the cross-over conductor from the adjacent coils at points of relatively high voltage stress.

Moreover, when this type of construction is followed, the winding has improved surge voltage characteristics in that the capacitance of each of the disks to ground, from the point of injection of surge voltage, will be the same as that of every other disk. Moreover, the transmission constant of each disk is the same, so that the surge voltage is distributed more uniformly between them.

Furthermore, the voltage between adjacent disks is never greater than the voltage of one of the disks.

Accordingly, a primary object of this invention is to provide a novel transformer disk winding construction which reduces labor costs.

Another object of this invention is to provide a novel transformer disk winding construction which has improved surge voltage characteristics.

A further object of this invention is to provide a novel transformer disk winding construction which avoids the need for rewinding every other disk winding.

Another object of this invention is to provide a novel method of winding disk wound transformer coils which eliminates the need for brazing.

These and other objects of this invention will become apparent from the following description when taken in connection with the drawings, in which.

Figure 1:
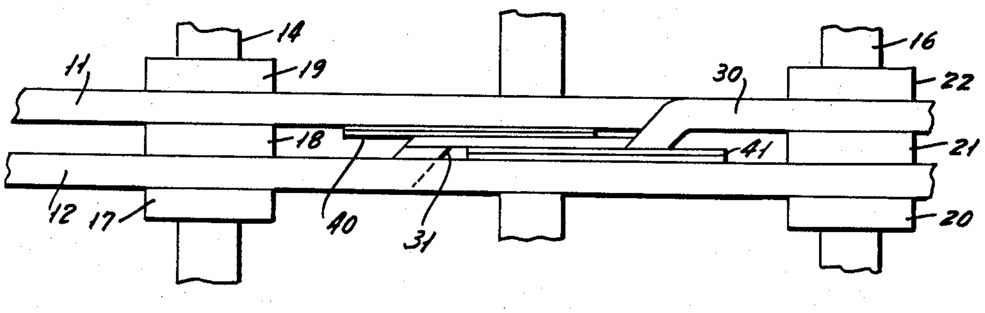
FIGURE 1 is an end view of two adjacent high voltage disks which are wound and interconnected in accordance with the present invention.
Figure 2:
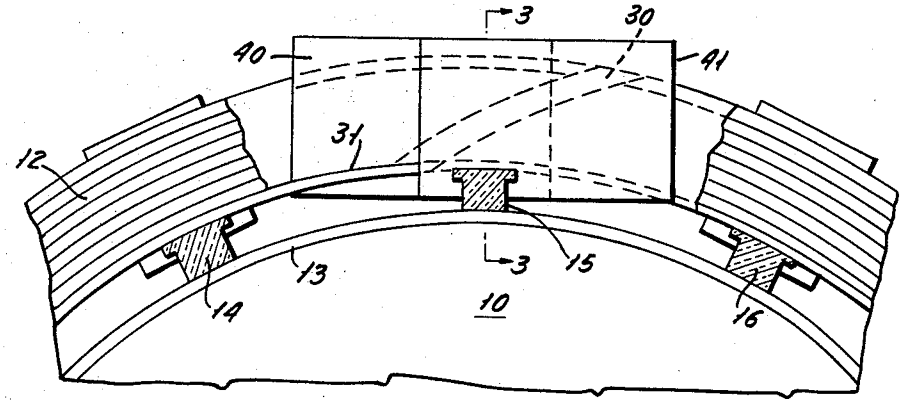
FIGURE 2 is a bottom view of the disks of FIGURE 1 with a portion of the second disk removed from the windings to indicate the disk winding arrangement.

Referring now to the figures, we have illustrated therein a portion of a transformer which has a magnetic core 10 (FIGURE 2) which may be constructed in any desired manner, and which receives a plurality of disk-type windings such as disk windings 11 and 12 of FIGURE 1. As shown in FIGURE 2, the disk-type windings such as disk-type winding 11 is formed of an appropriately insulated conductor which is spirally wound to any desired number of turns. The two disks 11 and 12 are secured to an insulating cylinder 13 by means of a plurality of circularly distributed key spacer sticks such as key spacer sticks 14, 15 and 16 which are of any appropriate material such as a molded phenolic, and are distributed completely around the cylinder 13, although only a few are shown in FIGURES 1 and 2.

The disks 11 and 12 are spaced from one another by axial spacers which could be provided on each key spacer stick such as axial spacers 17, 18 and 19 on stick 14 and spacers 20, 21 and 22 on stick 16. It will be apparent that spacers 18 and 21 on key spacer sticks 14 and 15 maintain coils 11 and 12 spaced from one another, while the outside spacers are provided to space further adjacent disk windings (not shown).

Each of the spacers 17 through 22 are provided with key slots, best shown in FIGURE 2, which appropriately receive the extending heads of key spacer sticks 14 and 16.

Figure 3:
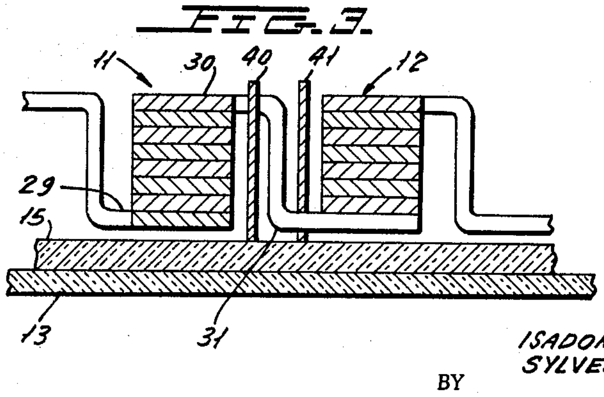
FIGURE 3 is a side cross-sectional view of the disks of FIGURE 2 seen across lines 3—3 in FIGURE 2.

In accordance with the present invention, the windings of disks 11 and 12 are wound from the inside out with the crossover occurring from the top of the first wound coil to the bottom of the next wound coil. Thus, coil 11 is wound with the start of the winding at inner section 29 (FIGURE 3). The top of the winding 30 is then appropriately bent down to inner end 31 at which point winding 12 is formed. Clearly, all succeeding windings are continuously formed in the same way.

In order to provide sufficient insulation at the crossover point, and in accordance with the invention, two spacers 40 and 41 are provided with eccentrically located key slots which are received by key spacer stick 15 in the manner shown in the figures.

The spacer 40 will insure appropriate insulation between the bottom of conductor section 31 and the bottom of disk 11, while the spacer 41 insures sufficient insulation between the top of winding portion 30 of disk 11 and disk 12.

Figure 4:
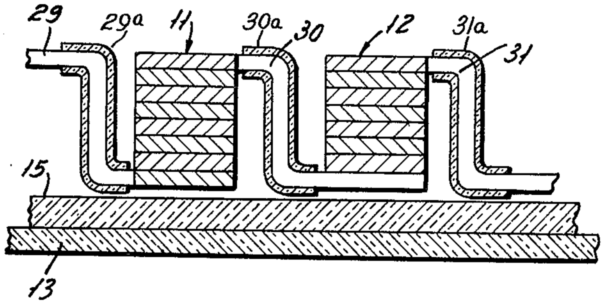
FIGURE 4 illustrates a modification of FIGURE 3 where the crossover portions of the windings have insulation tubing thereon.

If desired, the insulation for the crossover conductors could be formed of tubular insulation such as an appropriate insulation sleeve which may be shrinkable by heat or other means. In this case, sleeves cut to length are slipped on the conductor to be wound with the sleeves placed in position after a disk is finished. This type arrangement is shown in FIGURE 4 wherein insulation tubes 29*a*, 30*a* and 31*a* surround conductors 29, 30 and 31 respectively of an arrangement similar to that shown in FIGURE 3.

Figure 5:
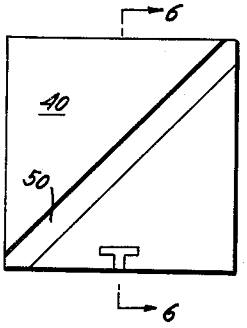
FIGURE 5 shows a spacer plate having a channel therein.
Figure 6:
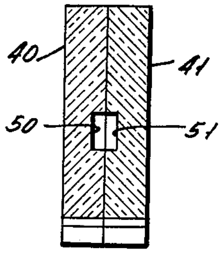
FIGURE 6 shows a cross-sectional view of two adjacent spacer plates of the type of FIGURE 5 as seen across lines 6—6 of FIGURE 5.

As a further embodiment of the invention, and to improve the ability of spacers 40 and 41 to serve as compression members and rigidly brace the cross-over connection, FIGURE 5 shows a diagonal slot 50 placed in the surface of spacer 40 which cooperates with a similar slot 51 in spacer 41. The slots 50 and 51 receive the cross-over winding portions to permit surface-to-surface engagement of the spacers 40 and 41.

While the cross-over portions of the two windings in FIGURES 1 and 2 are insulated from the disks 11 and 12 by spacers 40 and 41, it will be understood that appropriate insulation tubing could be provided wherein such tubing will fit over the cross-over conductor section.

Although this invention has been described with respect to its preferred embodiments, many variations and modifications will now be obvious to those skilled in the art, and it is preferred therefore that the scope of this invention be limited not by the specific disclosure herein but only by the appended claims.

What is claimed is:

1. A transformer winding comprising a plurality of disks each having a plurality of turns; each of said plurality of turns of each of said plurality of disks being formed of a single continuous conductor of constant cross-sectional shape; said single conductor having a flat rectangular cross-section; each of said disks comprising a spiral of single coplanar convolutions; each of said disks being stacked with respect to one another with adjacent disks being spaced from one another and in insulated relation with one another; said single continuous conductor having a plurality of connecting conductor portions in said single continuous conductor; the outer end of each of said plurality of disks being connected to the inner end of a disk adjacent thereto by a respective connecting conductor portion of said plurality of connecting conductor portions; and insulation means enclosing each of said connecting conductor portions to insulate said connecting conductor portions from the disks adjacent thereto; said insulation means comprising a first and second insulation spacer means positioned on either side of each of said connecting conductor portions.

2. The device substantially as set forth in claim 1 wherein said insulation spacer means further define compression members for spacing adjacent disks of said plurality of disks from one another.

References Cited by the Examiner

UNITED STATES PATENTS

| | | | |
|---|---|---|---|
| 1,629,293 | 5/27 | Newton | 336—207 X |
| 2,632,041 | 3/53 | Bilodeau | 336—185 X |
| 3,068,435 | 12/62 | Oliver et al. | 336—232 X |

JOHN F. BURNS, *Primary Examiner.*

E. JAMES SAX, *Examiner.*